United States Patent

[11] 3,612,024

| [72] | Inventor | John C. Bandimere |
| | | 3740 Fenton St., Wheatridge, Colo. 80033 |
| [21] | Appl. No. | 873,167 |
| [22] | Filed | Nov. 3, 1969 |
| [45] | Patented | Oct. 12, 1971 |

[54] AIR CLEANER BYPASS ARRANGEMENT
3 Claims, 4 Drawing Figs.

[52] U.S. Cl. ............................................. 123/198 E,
55/312, 123/142
[51] Int. Cl. ............................................. B01d 46/42,
F02m 17/34
[50] Field of Search ............................................. 123/198 E,
142, 119; 55/309, 312, 313, 314, 213

[56] References Cited
UNITED STATES PATENTS

| 2,277,069 | 3/1942 | Burwell ........................ | 55/314 |
| 2,303,333 | 12/1942 | Dauphinee .................... | 55/312 |
| 2,766,845 | 10/1956 | Raymond ...................... | 55/312 |
| 3,077,715 | 2/1963 | Carroll .......................... | 55/313 X |

FOREIGN PATENTS

| 1,172,479 | 10/1958 | France ........................ | 55/313 |
| 76,531 | 9/1961 | France ........................ | 55/309 |

*Primary Examiner*—Wendell E. Burns
*Attorney*—Sheridan, Ross & Burton

ABSTRACT: An internal combustion engine air cleaner, of particular utility for use with vehicle engines, characterized by a bypass valve which permits unfiltered air to enter the carburetor of an otto-type engine, or the intake manifold of a diesel or other solid injection engine, without passing through the filter element of the air cleaner. By comparative road mileage tests, with the valve open or closed, the operator may determine the need for cleaning or replacement of the air filter element. For top or full throttle performance, such as in racing, the operator may eliminate the airflow restriction through the filter element, with the valve open, and permit unfiltered air to enter the engine, thereby delivering a greater rate of flow to same. A further feature resides in the automatic closing of the bypass valve in the event of a backfire in the engine intake manifold to thereby confine the backfire flame to the interior of the air cleaner.

PATENTED OCT 12 1971  3,612,024
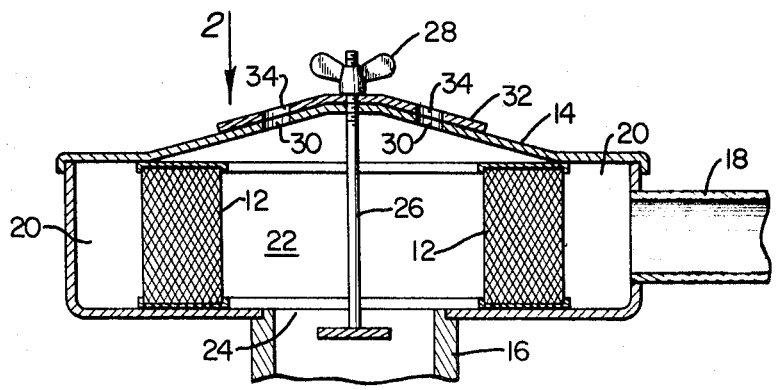
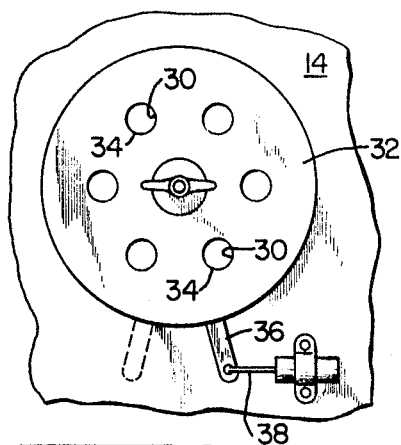
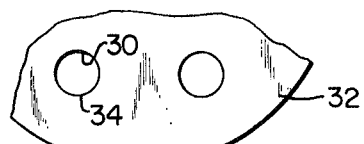
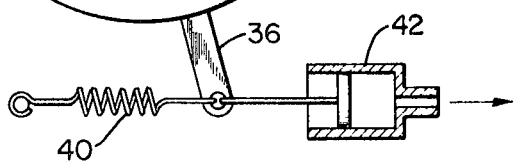
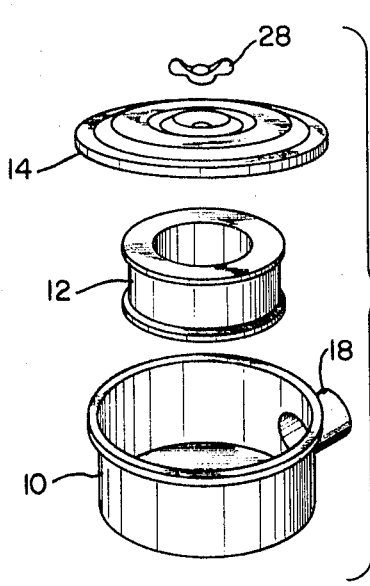
(PRIOR ART)
INVENTOR
JOHN C. BANDIMERE
BY Sheridan, Ross + Burton
ATTORNEYS

AIR CLEANER BYPASS ARRANGEMENT

BACKGROUND OF THE INVENTION

Internal combustion engines for propelling vehicles, such as automobiles, tractors, motorcycles, and the like, have long been equipped with air cleaners which filter foreign matter from the air which enters the engine to thus prevent undue wear of engine moving parts, accumulation of carbon, sticking of valves, etc. which would otherwise result from dust or other particles contained in atmospheric air. In gasoline engines the air cleaner is usually attached directly to the carburetor air intake and in diesel engines to the air intake manifold.

It is well known that when an air cleaner becomes clogged with foreign matter, thus increasing the resistance to airflow through same, the engine performance is reduced in two respects, first by increasing the fuel consumption, and second by reducing maximum engine power by reason of inability of the engine to properly aspirate or "breathe." In either case the mixture ratio of fuel to air increases, particularly at high speed, and the engine operates fuel-rich, thus effecting waste of fuel and poor engine performance. Since the clogging of the filter is gradual, the vehicle operator is generally unaware that his fuel mileage is constantly decreasing until he finally realizes that a considerable reduction in miles per unit of fuel has occurred. An automotive service mechanic can generally detect a clogged filter by visual inspection and clean same; however, in view of the relative low cost of a replacement filter element, a clogged filter element is more often discarded and replaced with a new filter element. More recently, apparatus has been devised for testing filter element airflow (or relative resistance to same) which indicates the amount of clogging and whether or not the filter element should be cleaned or replaced. Such equipment, however, generally is not directly available to the vehicle operator and the test usually entails servicing costs. It will now be apparent that if the vehicle operator could determine whether a filter element was sufficiently clogged to require cleaning or replacement this could be of considerable advantage to him and obviate subjecting him to the sometimes erroneous recommendation of service personnel that a filter element should be replaced. As will subsequently appear, the present invention provides a modification of a conventional air cleaner with which the operator may determine, with a mileage road test, whether the filter element should be cleaned or replaced.

In addition to the utility of the invention, as so far outlined, it has further utility when used on racing car engines, such as employed in hotrods, dragsters or the like where maximum engine performance is desired. Vehicle operators of this class are well aware that any restriction to carburetor airflow, even with a new filter element, reduces top or "all-out" engine performance by reason of the reduced quantity of air entering the engine at full throttle. In competitive racing, where certain rules usually must be complied with, such rules usually require the use of an air cleaner since, in addition to its functions previously set forth, it also serves as a flame suppressor which prevents an engine backfire from entering the engine compartment and possibly starting a fire therein. It thus becomes apparent that is such an operator could retain the air cleaner on the engine to comply with such rules, but could also bypass the filter element, when desired, this would enable him to obtain the peak potential performance from the engine.

In accordance with the disadvantages of the prior art, as heretofore outlined, one of the objects of the present invention is to provide an internal combustion engine air cleaner which is of generally conventional construction but modified in a manner to permit unfiltered air to enter the engine, thus providing an air bypass around its filter element.

Another object, consonant with the foregoing is to enable a vehicle operator to road test a vehicle in a manner to determine whether or not the filter element is clogged to thereby make suitable correction to obtain the maximum miles per gallon from the fuel.

Another object is to enable the operator to selectively bypass the air cleaner filter element, whereby its resistance to airflow is eliminated, thus permitting increased engine power and performance.

A further object is to employ certain preexisting parts of a conventional air cleaner, including its filter element, and add certain modifications which may be constructed at nominal cost, thus effecting considerable economy in the cost of the overall cleaner unit.

Still further objects, advantages and salient features will become more apparent from the description to follow, the appended claims, and the accompanying drawing to now be briefly described.

BRIEF DESCRIPTION OF THE DRAWING

FIG. A is an exploded view of a conventional prior art air cleaner;

FIG. 1 is a cross section through the assembled parts of FIG. A, but modified in accordance with the present invention;

FIG. 2 is a top plan view of a portion of FIG. 1, as viewed in the direction of arrow 2; and FIG. 3 depicts an alternative form of a valve actuator which may be employed in FIG. 2.

DESCRIPTION OF THE PREFERRED EMBODIMENTS

Referring now to the drawing, FIG. A depicts the principal components of a conventional engine air cleaner, comprising a base member 10, a ring-shaped filter element 12 and a cover 14. As well understood in the art, base member 10 seats on top of an air intake conduit 16 (FIG. 1) of a downdraft carburetor, filter element 12 is disposed within the base member and cover 14 forms a top closure for base member 10.

As better shown in FIG. 1, air enters intake air horn 18, passes into annular space 20 surrounding the filter element, thence radially through filter element 12, and into generally cylindrical space 22, and thence through air outlet opening 24 which is disposed in registry with the carburetor air intake 16. A stud 26 is affixed to the carburetor (or the air cleaner) and a wingnut 28 on same clamps the parts of the air cleaner together, as fully understood in the art.

As illustrated, base member 10 is cup shaped and cover 14 is disc shaped; however, it is to be understood that it is conventional practice to reverse these two parts and hence the term "cover" as hereinafter employed is intended to describe either construction, this, of course, per se, forming no part of the invention. Also, the filter element is generally rectangular in cross section, that is, its volume is a rectangle of revolution, similar to a toroid but differing in cross-sectional shape as just referred to. The cross-sectional shape is not germane to the invention, also, and it will be understood that its annular ends are sealed to the base member and cover so that all air must pass radially through same to space 22. Filter elements may be of two types, one being filled with metal gauze which may be wetted with oil and the other being formed of paper which appears to be superseding the oil bath type.

The conventional parts having been described, reference is made to FIGS. 1 and 2 wherein the cover 14 is modified to provide a plurality of angularly spaced apertures 30 which may be opened or closed by a rotary disc-shaped valve 32 provided with like apertures 34. A disc-shaped apertured gasket (not shown) may be disposed between cover 14 and valve 34 to prevent air leakage when the valve is closed. Preferably, the total area of the apertures equals or exceeds the intake area of horn 18 so that the same amount of air may enter space 22 as would enter if the filter element were omitted. Thus, assuming that the filter element were completely clogged the engine could receive the same amount of air as it would receive through the horn and with the filter element omitted. Otherwise stated, the carburetor may receive even more air than could pass through an unclogged filter element. Under such conditions the engine may receive as much air as it could receive with the filter unit omitted which, of course, represents the maximum "breathing" capacity of the engine but, nevertheless, retains the cleaner unit on the engine so that its filter element can prevent a backfire through the air horn 18.

In general, valve 32 will be either fully closed or fully open. It may be operated by an arm 36 (FIG. 2) affixed to the valve and through a Bowden wire or cable 38 which is accessible to the vehicle operator.

FIG. 3 illustrates a modification which has particular utility for racing cars. In this construction arm 36 urged by spring 40, maintains valve 32 closed when the engine is not operating. When engine operation begins, vacuum-operated actuator 42, communicating with the intake manifold (not shown), opens the valve due to the reduced pressure or suction in the manifold. So long as suction is maintained in the manifold the valve will remain open and the engine will receive bypassed or unfiltered air. In the event a backfire occurs, however, the higher pressure developed in the intake manifold will operate the actuator to close valve 32, thus ensuring that all backfire flame is confined within the air cleaner. As will be apparent, with this automatic control to close valve 32, in response to a backfire, the rules pertaining to the use of an air cleaner under racing conditions are complied with yet the engine may receive a greater quantity of unfiltered air than would be possible had the ambient air passed through the filter element.

As will be apparent, a preexisting cover may be modified, as a retrofit for same, incorporating a suitable bypass valve and hence such construction is contemplated within the purview of the invention as well as a cover and valve designed as replacement parts of the air cleaner, or as an entire replacement for same.

What is claimed is:

1. In an internal combustion engine air cleaner of the type having a circular base member and a circular cover forming a generally cylindrical casing and containing a conventional ring-shaped filter, replaceable as an integral unit, said unit having annular substantially flat parallel surfaces at opposite sides thereof adapted to seat against the base member and cover, whereby air may pass through the filter only in inward radial directions from an annular space surrounding same, said annular space communicating with atmosphere, the central space within the unit communicating with an air intake passage to the engine, such as a carburetor intake passage, said intake passage having a central stud affixed thereto and having a nut on the end thereof, said nut adapted to secure the base member, filter unit, and cover in the assembled relation set forth, the improvements in combination comprising,
   a. a circular disk valve disposed on and abutting the outer surface of the cover and pivoted on said stud,
   b. said disk valve having a plurality of apertures therein spaced angularly about said stud, whereby the stud also serves as a pivot for said disk valve,
   c. a plurality of like angularly spaced apertures in the cover adapted to be opened or closed, depending upon the angular position of the disk valve relative to the cover, and
   d. means for rotating the disk valve between open and closed positions.

2. Apparatus in accordance with claim 1 wherein said means for rotating the disk comprises a movable actuator having an end thereof affixed to the disk at a point to form a lever arm for rotating same.

3. Apparatus in accordance with claim 1 including an air horn communicating said annular space with atmosphere.